United States Patent [19]
Marx

[11] 3,711,057
[45] Jan. 16, 1973

[54] HEAVY DUTY SEAT ADJUSTER

[75] Inventor: Thomas O. Marx, Rockton, Ill.

[73] Assignee: Atwood Vacuum Machine Company, Rockford, Ill.

[22] Filed: Dec. 28, 1970

[21] Appl. No.: 101,804

[52] U.S. Cl. ................................................ 248/430
[51] Int. Cl. ............................................... B60n 1/08
[58] Field of Search ...... 248/430, 429, 407, 408, 409, 248/423; 287/58 R, 58 CT

[56] References Cited

UNITED STATES PATENTS

| | | | |
|---|---|---|---|
| 3,052,443 | 9/1962 | Lagstrom | 248/430 |
| 3,491,979 | 1/1970 | Wonell | 248/430 |
| 3,278,223 | 10/1966 | Panhard | 248/430 |

*Primary Examiner*—Edward C. Allen
*Attorney*—Andrew F. Wintercorn

[57] ABSTRACT

This seat adjuster is useful interchangeably as either a right or left-hand unit, thus eliminating the necessity for providing two slightly different units to form a pair. The latch in each unit is of elongated form and slidably guided at opposite ends in registering holes in the opposite side walls of an inverted channel bracket carried on the upper movable slide so as to operate crosswise relative to a lower fixed track channel in slots provided in registering relation in the opposite side walls thereof. A channel portion intermediate the ends of the latch has the edge portions of its side walls engaging in neighboring notches provided in evenly spaced relation along one side of the aforesaid slots, thus providing four points of interlocking engagement as against only two in previous constructions. The latch has compression springs caged under preload on its opposite ends on extensions of the web portion of the channel between attaching brackets staked onto the ends of the extensions and washers slidably guided on the extensions and abutting the opposite side walls of the fixed lower track channel, so the latch is normally held in locked position under balanced spring pressure but can be pulled endwise in either direction to unlocked position in which elongated notches in the upper edges of the side walls of the channel register with the one set of notches in one of the slotted side walls of the fixed lower track while the one end of the channel also comes clear of the other set of notches in the other side wall of the fixed lower track.

10 Claims, 7 Drawing Figures

PATENTED JAN 16 1973

INVENTOR:
THOMAS O. MARX

ATTORNEY

PATENTED JAN 16 1973 3,711,057

INVENTOR:
THOMAS O. MARX

ATTORNEY

3,711,057

HEAVY DUTY SEAT ADJUSTER

This invention relates to a heavy duty seat adjuster for motor vehicles, and is more particularly concerned with the novel U-shaped sliding bolt-type latches to be disengaged for adjustments of the seat slides forwardly or rearwardly by movement endwise in either direction transversely with respect to the seat slides, thereby making each seat adjuster unit useful interchangeably for right or left-hand installation and avoiding many of the objections that went with constructing these units as heretofore, one for right-hand use only and another for only left-hand use, an appreciable saving in ultimate cost being realized by such standardization.

In accordance with my invention each latch has compression springs caged on the opposite ends thereof under a predetermined pre-load holding pressure normally in locked position until the latch is moved endwise to released position.

The present seat adjuster construction is equally well adapted for use in pairs under bucket seats that are individually adjustable fore and aft as for the conventional full length or bench seat having seat slide assemblies under opposite ends controlled by the driver form his end of the seat.

The invention is illustrated in the accompanying drawings, in which.

Figure 6:
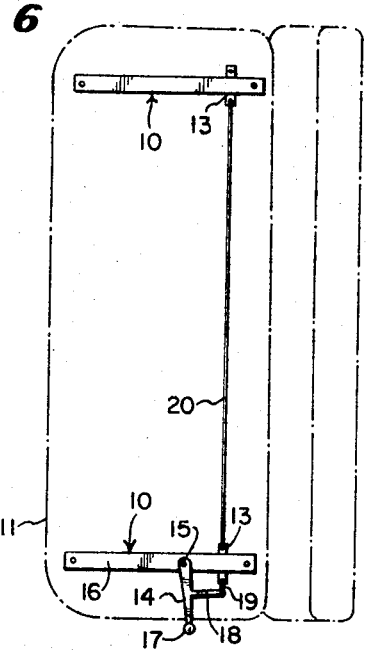
Figure 7:
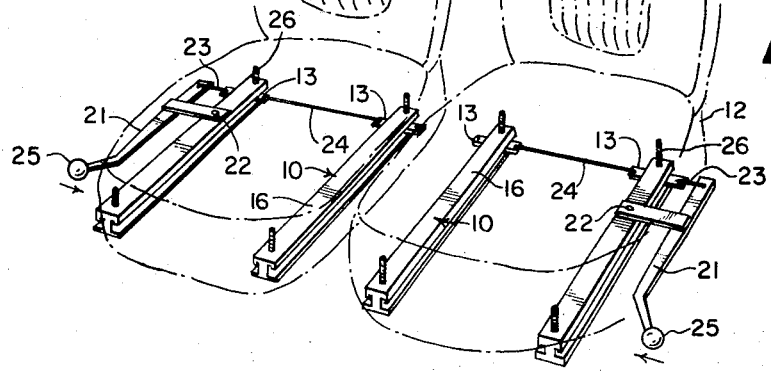

FIG. 6 is a plan view of a full length or bench type seat indicated in phantom and showing two of the seat slide units in use under opposite ends of the seat and adapted to be controlled by the driver from his position at the left end, and FIG. 7 is a perspective view in phantom of two bucket seats showing how each seat is separately adjustable in a fore and aft direction by means of its adjuster units.

The same reference numerals are applied to corresponding parts throughout the views.

Referring to the drawings, and first more particularly FIGS. 1 to 3, 6 and 7, each heavy duty seat adjuster embodying my invention is indicated generally by the reference numeral 10, and, inasmuch as both seat adjuster units for any given seat are identical, whether it be a seat of the full length bench type, as shown at 11 in FIG. 6, or of the bucket type shown at 12 in FIG. 7, both of the pair shown in FIG. 6 are numbered 10 and both of each pair shown in FIG. 7 are correspondingly numbered. The only difference in any given installation is with respect to the means for operating the latches 13, the full length seat 11 usually, though not necessarily, having a hand lever 14 pivoted at one end, as at 15, to the adjacent upper seat slide or track 16 for operation by the handle 17 projecting from the left side of the seat, the lever 14 having a rearward projection 18 link, as indicated at 19, to one end of the adjacent latch 13, while the other end of that latch is linked, as indicated at 20, to the inner end of the other latch 13. In the case of the bucket seats 12, each seat is shown as having a long lever 21 pivoted intermediate its ends, as at 22, to the upper slide or track 16 near the rear end thereof and linked, as shown at 23, to the inner end of the adjacent latch 13, while the other latch 13 is connected at its inner end by a link 24 to the first latch 13. Handles 25 on the front ends of the levers 21 project forwardly from below the seats 12 for convenient operation by the individuals occupying these seats. The upper seat slide or track of each seat adjuster assembly 10 is attached to the bottom of the seat by means of bolts 26 or in any other suitable manner while other bolts 27 serve to fasten each seat adjuster assembly 10 to the floor by means of the lower slide or track 28. Each of the latter has a channel 29 riveted on the top thereof, as indicated at 30, the outwardly flanged edges 31 of which cooperate with the inwardly flanged edges 32 of the upper seat slide or track 16 to define raceways for pairs of bearing balls 33 that are held in properly spaced relationship by a thin walled cage or retainer 34, each of which also retains a roller 35 running on the webs of the two channels 16 and 29 for anti-friction support of both ends of the upper slide or track 16 for easy fore and aft adjustment of the seat, whether the seat is the full length bench type 11 of FIG. 6 or the bucket seat type 12 of FIG. 7.

Figure 1:
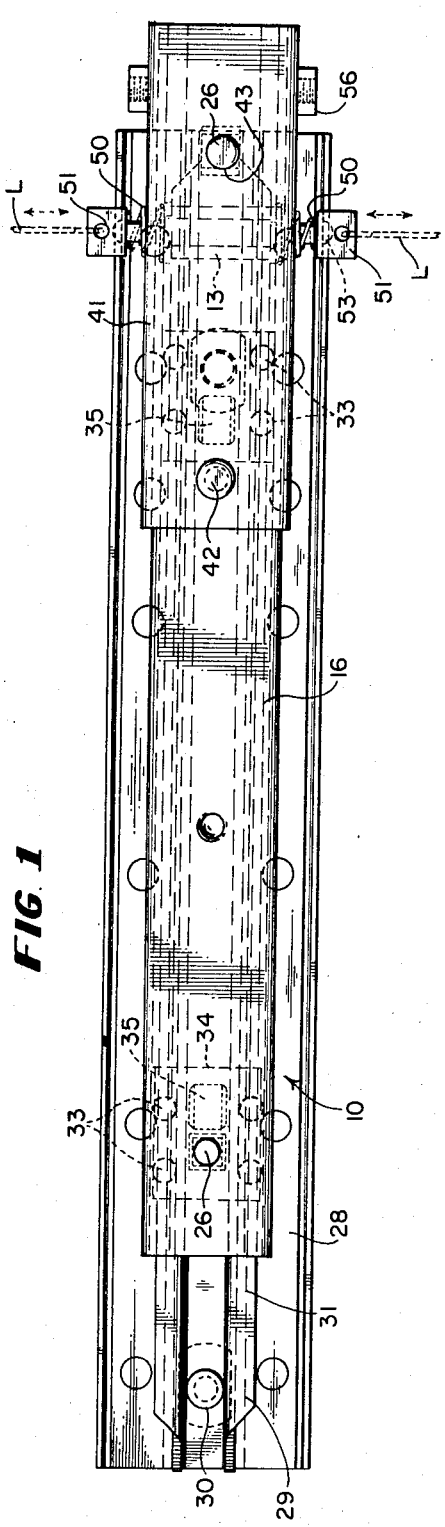
FIGS. 1 and 2 are, respectively, a plan view and a side view of one of my improved heavy duty seat adjuster units, FIG. 1 indicating by double-ended arrows on opposite sides how the U-shaped sliding latch that is held by spring means at opposite ends normally in locked position is adapted to be operated in either direction, thus making for great adaptability as will soon appear.
Figure 2:
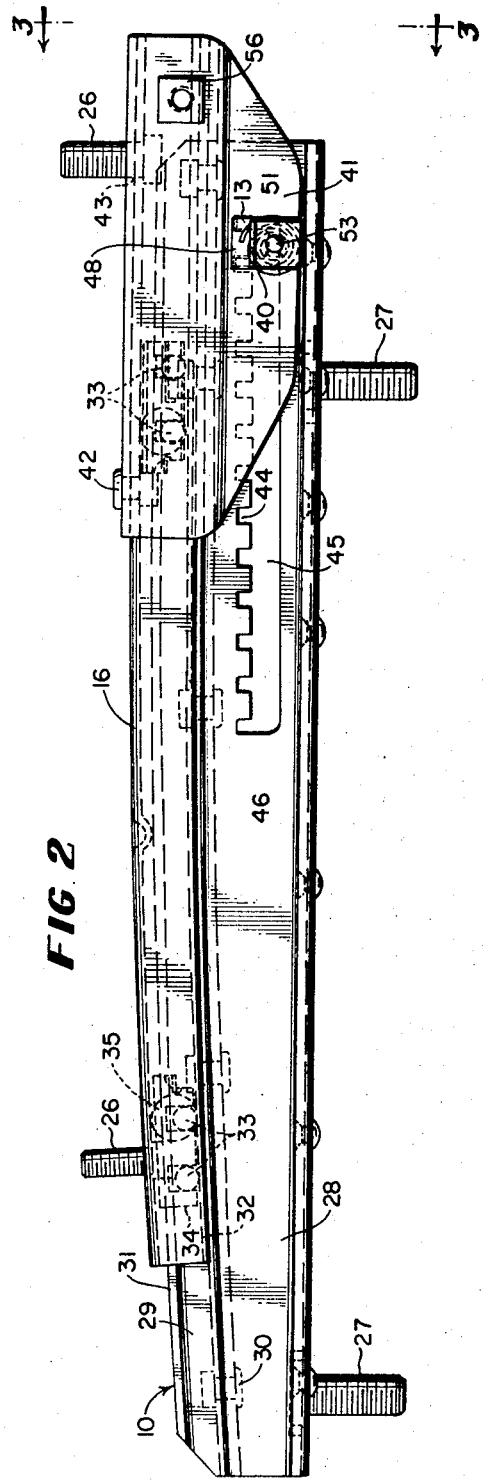
Figure 3:
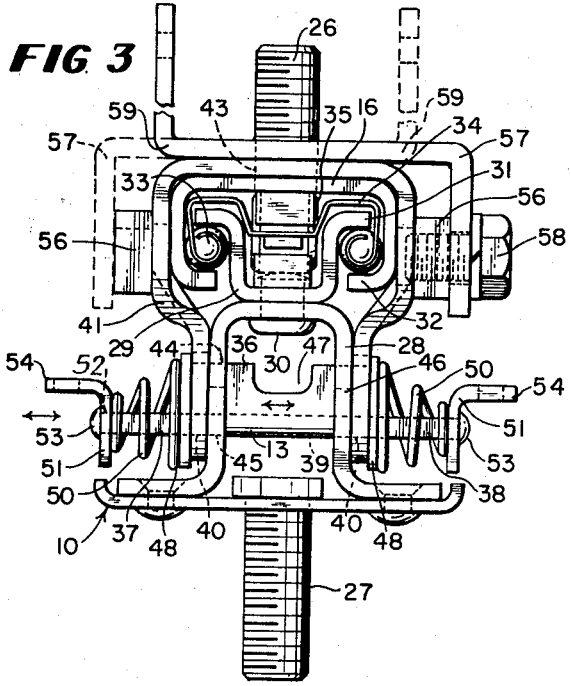
FIG. 3 is an end view of one of these assemblies taken on the line 3—3 of FIG. 2, this view serving to illustrate the two-way slidable, spring-centered, U-shaped latch to best advantage.
Figure 4:
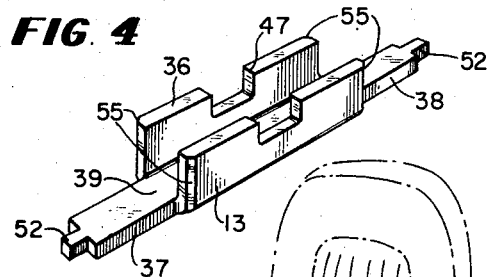
FIG. 4 is a perspective view of the U-shaped latch removed from the assembly to enable better illustration of its construction.
Figure 5:
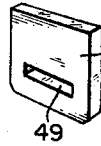
FIG. 5 is a perspective view of one of the two slotted washers that are assembled on the opposite ends of the slidable latch to transmit spring pressure to the latch to return it to its central locking position after a seat adjustment has been made.

Referring now to FIGS. 2 – 4, each latch 13, which, as seen in FIG. 4, has a channel-shaped middle portion 36 and opposed end extensions 37 and 38 of the web portion 39, is slidably guided at opposite ends of the channel-shaped middle portion 36 in U-shaped holes 40 in the downwardly extending side walls of an inverted U-shaped sheet metal yoke or bracket 41 that straddles and is fixed to the upper slide or track 16 at the rear end thereof. The bracket 41 is suitably riveted to the part 16 as shown at 42, and also has the rear attaching bolt 26 extending through a hole 43 in the web portion of the bracket as another means of support against endwise displacement relative to the seat adjuster assembly 10. The channel portion 36 of the latch 13 has the upper edge portions of its side walls normally engaged in two neighboring notches of a series of evenly spaced notches 44 provided along the upper edges of elongated slots 45 provided in registering relationship in the opposed side walls 46 of the lower slide or track 28. The side walls of the channel 36 are notched out on top intermediate the ends thereof, as shown at 47, and when these notches 47, by reason of endwise movement of of the latch 13 endwise in either direction come into full register with the notches 44 in either side wall 46, the seat is unlocked and can be adjusted in a forward or rearward direction, assuming the latch 13 is at some position intermediate the ends of the registering slots 45. It is shown in FIGS. 1 and 2 as disposed at the rear end of the slots 45. The notches 47 are long enough in relation to the overall length of the side walls of the channel 36 and so spaced in relation to the ends of these side walls that when notches 47 come into full register with the notches 44 in one side wall of the channel 28 the end of channel 36 is out of register with the other set of notches 44 in the other side wall of the channel 28 whereby to unlock the seat adjuster for adjustment of the seat forwardly or rearwardly. Rectangular washers 48 slotted across the lower portion, as at 49, as seen in FIG. 5, for slidable nonrotary reception of the end extensions 37 and 38, are assembled on these extensions behind the large inner ends of compressed conical-shaped coiled compression springs 50, the smaller outer ends of which bear against the vertical leg of L-shaped brackets 51 that are riveted to the reduced outer ends 52 of the extensions, as shown at 53. The portions 52 are of rectangular form and fit in holes of corresponding shape punched in the brackets 51, so that there is no danger of these brackets turning out of the correct position where the perforated horizontal legs 54 of the brackets are correctly disposed for convenient link connection, as at 19, 20, 23 and 24, as previously described, for manual operation of the latches 13. The preload compression of the springs 50 keeps the washer 48 bearing against the side walls of channel 41 adjacent opposite ends of the channel 36, thereby holding the latch 13 normally in locked position with balanced spring pressure. Though it is only about 0.010 inch end clearance and therefore too small to show in the drawings, the ends of the channel 36 stop that much short of engaging the washers 48 to keep the latch 13 normally in centered locked position under balanced pressure of springs 50. When a pull is exerted on either end of the latch 13 to disengage it from locking position, one of the springs 50 is compressed further but the other, being caged on the extension 37 or 38 between the channel 36 and bracket 51, retains substantially all of its preload compression.

The operation of the latch is believed to be clear from the previous description of FIGS. 6 and 7, when taken with the further detailed description of FIGS. 2 to 4 above. Obviously, with double the amount of interlocking engagement afforded by the two side walls of channel 36 entered in four notches 44, two in each side wall of channel 41, as compared with only two notch engagement in the prior seat adjusters, my construction gives about double strength, warranting calling it a heavy duty seat adjuster. In view of the operating clearance necessarily provided for each latch 13 in registering holes 40 and slots 45 and to insure easy reentry of the ends of channel 36 in notches 44, the ends of the channel 36 are chamfered, as shown to an exaggerated extent at 55 in FIG. 4. Either of the brackets 51 of the seat adjuster assembly 10 is adapted to be connected with a link L, as indicated in dotted lines in FIG. 1, for operation of the latch 13 laterally with respect to the adjuster assembly in either direction, and hence, this seat adjuster is obviously useful interchangeably for right or left-hand installation, thus avoiding many of the objections that went with constructing these assemblies as heretofore one for right-hand use only and another for only left-hand use. Appreciable savings in ultimate cost are therefore realized by this standardization.

In conclusion, either of the nuts 56 shown welded to the rear end of the brackets 41 on opposite sides is adapted to be used as an anchorage point for a seat belt bracket 57 applicable to either side of the seat adjuster 10, as shown in dotted lines and full lines in FIG. 3, the bracket being fastened by means of a bolt 58 threaded in the nut 55. The bracket 57, by bearing against the top of the bracket 41, as shown at 59 is held against turning about the bolt 58 as a center.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In a seat slide structure operable interchangeably as either a right or left-hand unit comprising an elongated stationary horizontal lower slide member, a horizontal seat supporting upper slide member slidably supported on said lower slide member in telescoping relation thereto, one of said slide members having opposed substantially parallel side walls with registering elongated slots provided therein longitudinally thereof and a series of notches provided along one edge of each of said slots in uniformly spaced relation, and an elongated channel-shaped latch mounted for reciprocation on the other slide member to and from either of two seat locking positions in transverse relation to said slide members with edge portions of its two side walls slidably engaged in two neighboring ones of said notches in both slots to lock said upper slide member in a selected position of adjustment relative to the lower slide member, said latch having edge portions of the side walls of the channel notched in registering relation in a predetermined spaced relation to one end of the channel to clear the notches in one side wall of the slotted slide member when the latch is moved endwise from either locking position relative to the other side wall to released position.

2. A seat slide structure as set forth in claim 1 including an extension of the web portion of the channel of the latch on both ends, on each of which resilient means is caged while bearing against the adjacent side wall of the latch supporting slide member normally holding the latch in locking position under substantially balanced resilient pressure.

3. A seat slide structure as set forth in claim 1 including an extension of the web portion of the channel of the latch on both ends, on each of which resilient means is caged while bearing against the adjacent side wall of the latch supporting slide member normally holding the latch in locking position under substantially balanced resilient pressure, and means connected with one end of said latch for giving it endwise movement to released position against action of one of said resilient means.

4. A seat slide structure as set forth in claim 1 including an extension of the web portion of the channel of the latch on both ends, on each of which resilient means is caged while bearing against a washer slidably guided on the extension and abutting the adjacent side wall of the latch supporting slide member normally holding the latch in locking position under substantially balanced resilient pressure.

5. In a seat slide structure operable interchangeably as either a right or left-hand unit comprising an elongated stationary horizontal lower slide member, a horizontal seat supporting upper slide member slidably supported on said lower slide member in telescoping relation thereto, one of said slide members having opposed substantially parallel side walls with registering elongated slots provided therein longitudinally thereof and a series of notches provided along one edge of each of said slots in uniformly spaced relation, and an elongated channel-shaped latch mounted for reciprocation on the other slide member in transverse relation to said slide members with edge portions of its two side walls slidably engaged in two of said notches in both slots to lock said upper slide member in a selected position of adjustment relative to the lower slide member, said latch having edge portions of the side walls of the channel notched in registering relation in the same predetermined spaced relation to both ends of the channel to clear the notches in either side wall of the slotted slide member when the latch is moved endwise in either direction from locked position to released position.

6. A seat slide structure as set forth in claim 5 including an extension of the web portion of the channel of the latch on both ends, on each of which resilient means is caged while bearing against the adjacent side wall of the latch supporting slide member normally holding the latch in locking position under balanced resilient pressure.

7. A seat slide structure as set forth in claim 5 including an extension of the web portion of the channel of the latch on both ends, on each of which resilient means is caged while bearing against the adjacent side wall of the latch supporting slide member normally holding the latch in locking position under balanced resilient pressure, and means connected with either end of said latch for giving it endwise movement to released position against resistance of one of said resilient means.

8. A seat slide structure as set forth in claim 5 including an extension of the web portion of the channel of the latch on both ends, on each of which resilient means is caged while bearing against a washer slidably guided on the extension and abutting the adjacent side wall of the latch supporting slide member normally holding the latch in locking position under substantially balanced resilient pressure.

9. A seat slide structure as set forth in claim 5 wherein the channel portion of said latch is slightly shorter than the width of said lower slide member.

10. A seat slide structure as set forth in claim 5 including an extension of the web portion of the channel of the latch on both ends, on each of which resilient means is caged while bearing against a washer slidably guided on the extension and abutting the adjacent side wall of the latch supporting slide member normally holding the latch in locking position under substantially balanced resilient pressure, the channel portion of said latch being slightly shorter than the width of said slotted slide member, whereby the washers are normally spaced from the ends of said channel portion.

* * * * *